United States Patent Office 3,776,845
Patented Dec. 4, 1973

3,776,845
DRY FILM LUBRICANT CONSISTING OF SYNTHETIC RESIN, FLUORINATED GRAPHITE, AND SOLID LUBRICANTS SUCH AS MOLYBDENUM DISULFIDE, GRAPHITE, AND POLYTETRAFLUOROETHYLENE
Nobuatsu Watanabe, Kyoto, Hideaki Kusuno, Nishinomiya, and Yutaka Ishida, Suita, Japan, assignors to Nippon Paint Co., Ltd., Osaka, and Nippon Carbon Co., Ltd., Tokyo, Japan
No Drawing. Filed May 11, 1970, Ser. No. 36,467
Claims priority, application Japan, May 16, 1969, 44/37,756
Int. Cl. C10m 7/14, 7/28, 7/06
U.S. Cl. 252—12                                                4 Claims

ABSTRACT OF THE DISCLOSURE

A novel, coating composition for dry film lubricant which comprises a synthetic resin for paint containing dispersed therein a mixture of at least one conventional lubricating material having a particle size of up to 60 microns, such as molybdenum disulfide powder, graphite powder or polytetrafluoroethylene powder, and a fine fluorinated graphite powder having a particle size of up to 60 microns, the proportion of said synthetic resin to said mixture being 90:10 to 10:90, preferably 60:40 to 40:60, by weight and the proportion of the conventional lubricating material to the fluorinated graphite powder being 99.5:0.5 to 5:95, preferably 70:30 to 30:70, by weight. Said coating composition has an increased critical PV value and substantially the same friction coefficient as that of a conventional one. The dry film of the coating composition acts as a durable, solid lubricant.

---

The present invention relates to a coating composition for dry film lubricant. More particularly, it relates to a coating composition for dry film lubricant, which comprises a synthetic resin for paint containing dispersed therein at least one conventional lubricating material and a fluorinated graphite powder.

Conventional lubricating materials, such as molybdenum disulfide powder, graphite powder or polytetrafluoroethylene powder which have a particle size of up to 60 microns, have themselves excellent lubricity, and hence, when applied as such to parts requiring lubricity, show high lubrication effects. However, the effects are not maintained so long, and the surface to which the lubricating materials are applied is contaminated. Therefore, the lubricating materials have heretofore been used in the state dispersed in a synthetic resin, whereby a coating composition for dry film lubricant has been obtained. This is disclosed in Japanese patent publication No. 22,469/65. However, such a coating composition has not been satisfactory in critical PV value, and hence has not been suitable for use under a high load. The critical PV value is a standard for determining the lubricity of a coating composition for dry film lubricant and the durability of the film, and is represented by a product of load (kg./cm.²) and velocity (m./min.). The larger the critical PV value, the higher the durability of the film of paint. For example, regarding general plastics, polytetrafluoroethylene has a critical PV value of 22, and nylon 66 and a polyimide resin have critical PV values of 66 and 530, respectively. An acetal resin has a critical PV value of 66. Further, a bearing alloy has a critical PV value of about 90,000.

The present inventors have done research on increasing the critical PV value to find that the addition of fluorinated graphite to a conventional lubricating coating composition results in the enhancement of the critical PV value of the coating composition.

An object of the present invention is to provide a coating composition for dry film lubricant having an increased critical PV value.

Another object of the present invention is to provide a coating composition for dry film lubricant comprising a synthetic resin for paint containing dispersed therein at least one conventional lubricating material having a particle size of up to 60 microns and a fluorinated graphite powder having a particle size of up to 60 microns.

Other objects and effects of the invention will be apparent to those skilled in the art from the following description.

According to the present invention, there is provided a coating composition for dry film lubricant, which comprises a synthetic resin for paint containing dispersed therein a mixture of at least one conventional lubricating material having a particle size of up to 60 microns and a fluorinated graphite powder having a particle size of up to 60 microns, the proportion of said conventional lubricating material to said fluorinated graphite powder being 99.5:0.5 to 5:95 by weight, the proportion of said mixture to said synthetic resin being 90:10 to 10:90 by weight.

The dry film of the present coating composition can act as a durable solid lubricant. Therefore, when the composition is applied to a mechanical device having bearings and sliding parts, non-oily lubricity is imparted to the device.

As compared with a coating composition containing a conventional lubricating material alone, the present coating composition comprising a conventional lubricating material and a fluorinated graphite powder has a greatly increased critical PV value (Kg./cm.²·m./min.) without increasing friction coefficient.

The conventional lubricating materials include molybdenum disulfide powder, graphite powder and polytetrafluoroethylene powder having a particle size of up to 60 microns, and may be used alone or in admixture of two or more.

The fluorinated graphite used in the present invention is prepared by reacting a carbon or graphite powder with fluorine and has a molecular structure in which carbon atoms are connected to one another by a single bond in the form of a hexagonal network, each carbon atom having one fluorine atom strongly bonded thereto by a covalent bond. However, when said reaction is effected with an insufficient amount of fluorine or the reaction is discontinued on its way, only the surface layer is converted into fluorinated graphite and the center of each particle remains as such. The fluorinated graphite has a great electric insulation, is difficult to wet with an oil or water and is resistant to chemicals, such as acids, alkalis and the like. Further, said fluorinated graphite is very stable against heat though decomposes at a temperature of more than 500° C. and has excellent lubricity similar to conventional lubricating materials. Even when the surface layer only is fluorinated, the lubricity is satisfactory as far as the pressure applied is low. That is, the lubricity of fluorinated graphite on the surface layer is very great, and hence, the fluorinated graphite film is not broken unless a particularly large pressure is applied thereto. Even if the fluorinated graphite film is broken, no difficulty is caused because the interior therefrom is constituted of graphite rich in lubricity. A method for producing fluorinated graphite is disclosed in Japanese patent publication No. 21,959/63, which comprises reacting a flaked graphite with fluorine or a halogen fluoride at a temperature of 350° to 500° C. under ordinary pressure, whereby a solid fluorinated graphite having a high fluorine content is obtained.

In the present invention, the proportion of the conventional lubricating material to the fluorinated graphite powder is 99.5:0.5 to 5:95 by weight, preferably 70:30 to 30:70 by weight. Although the fluorinated graphite shows good properties even in a small amount, the critical PV value is rapidly lowered when the amount of fluorinated graphite is smaller than 0.5 part by weight per 99.5 parts by weight of the conventional lubricating material, and the effect of the fluorinated graphite is not exhibited. Further, when the amount of fluorinated graphite is larger than 95 parts by weight per 5 parts by weight of the conventional lubricating material, the friction coefficient becomes larger than that of the conventional lubricating material alone and an economical disadvantage is brought about.

The synthetic resin for paint used in the present invention is required to have properties necessary as a dry film lubricant, such as heat-resistance, adhesion to substrates and the like, and preferable examples thereof are epoxy resins, polyvinyl resins and phenolic resins. The proportion of the resin to the mixture of the conventional lubricating material and the fluorinated graphite ranges from 90:10 to 10:90 by weight, preferably 60:40 to 40:60 by weight. When the amount of the resin is smaller than 10 parts by weight per 90 parts by weight of said mixture, the surface of the resulting film is rough and hence, the lubricating material is easily removed by rubbing. In addition, the adhesion of the film to a substrate is weak in this case, and therefore, it is impossible to maintain lubricity for a long time. When the amount of the resin is higher than 90 parts by weight per 10 parts by weight of said mixture, it follows that the resin completely covers the lubricating material particles, with the result that the critical PV value is reduced and the lubricity is simultaneously lowered.

The present invention is further explained by the following examples, which are by way of illustration and not by way of limitation.

EXAMPLE 1

| | G. |
|---|---|
| Epoxy resin having an epoxy equivalent of 1,900 (Epikote 1007 of Shell) | 40 |
| Phenolic resin solution (Hitanol 4020 of Hitachi Chemical) | 30 |
| Diacetone alcohol | 40 |
| Toluene | 20 |
| Polytetrafluoroethylene powder having a particle size of about 1 to about 3 microns | 25 |
| Fluorinated graphite powder (fluorination: 100%) having a particle size of about 1 to about 6 microns | 25 |
| Total | 180 |

The above materials were placed in a pot mill and sufficiently ground to form a soltuion, which was used as a test paint.

EXAMPLE 2

| | G. |
|---|---|
| Epoxy resin having an epoxy equivalent of 1,900 (Epikote 1007 of Shell) | 40 |
| Phenolic resin solution (Hitanol 4020 of Hitachi Chemical) | 30 |
| Diacetone alcohol | 40 |
| Toluene | 20 |
| Graphite powder having a particle size of about 3 to about 10 microns | 25 |
| Fluorinated graphite powder (fluorination: 100%) having a particle size of about 1 to about 6 microns | 25 |
| Total | 180 |

These materials were treated in the same manner as in Example 1 to obtain a test paint.

EXAMPLE 3

| | G. |
|---|---|
| Epoxy resin having an epoxy equivalent of 1,900 (Epikote 1007 of Shell) | 40 |
| Phenolic resin solution (Hitanol 4020 of Hitachi Chemical) | 30 |
| Diacetone alcohol | 40 |
| Toluene | 20 |
| Graphite powder having a particle size of about 50 microns | 40 |
| Flourinated graphite powder (fluorination: 60%) having a particle size of about 1 to about 6 microns | 10 |
| Total | 180 |

These materials were treated in the same manner as in Example 1 to obtain a test paint.

EXAMPLE 4

| | G. |
|---|---|
| Epoxy resin having an epoxy equivalent of 1,900 (Epikote 1007 of Shell) | 40 |
| Phenolic resin solution (Hitanol 4020 of Hitachi Chemical) | 30 |
| Diacetone alcohol | 40 |
| Toluene | 20 |
| Polytetrafluoroethylene powder having a particle size of about 1 to about 3 microns | 10 |
| Fluorinated graphite powder (fluorination: 80%) having a particle size of about 30 microns | 40 |
| Total | 180 |

These materials were treated in the same manner as in Example 1 to obtain a test paint.

EXAMPLE 5

| | G. |
|---|---|
| Polyvinyl chloride resin (V.A.G.H. of U.C.C.) | 20 |
| Dioctyl phthalate | 3 |
| Methyl isobutyl ketone | 60 |
| Toluene | 60 |
| Polytetrafluoroethylene powder having a particle size of about 1 to about 3 microns | 10 |
| Fluorinated graphite powder (fluorination: 100%) having a particle size of about 1 to about 6 microns | 10 |
| Total | 165 |

These materials were treated in the same manner as in Example 1 to obtain a test paint.

COMPARATIVE EXAMPLE 1

| | G. |
|---|---|
| Epoxy resin having an epoxy equivalent of 1,900 (Epikote 1007 of Shell) | 40 |
| Phenolic resin solution (Hitanol 4020 of Hitachi Chemical) | 30 |
| Diacetone alcohol | 40 |
| Toluene | 20 |
| Polytetrafluoroethylene powder having a particle size of about 1 to about 3 microns | 50 |
| Total | 180 |

These materials were treated in the same manner as in Example 1 to obtain a test paint.

COMPARATIVE EXAMPLE 2

|   | G. |
|---|---|
| Epoxy resin having an epoxy equivalent of 1,900 (Epikote 1007 of Shell) | 40 |
| Phenolic resin solution (Hitanol 4020 of Hitachi Chemical) | 30 |
| Diacetone alcohol | 40 |
| Toluene | 20 |
| Graphite powder having a particle size of about 3 to about 10 microns | 50 |
| Total | 180 |

These materials were treated in the same manner as in Example 1 to obtain a test paint.

COMPARATIVE EXAMPLE 3

|   | G. |
|---|---|
| Epoxy resin having an epoxy equivalent of 1,900 (Epikote 1007 of Shell) | 40 |
| Phenolic resin solution (Hitanol 4020 of Hitachi Chemical) | 30 |
| Diacetone alcohol | 40 |
| Toluene | 20 |
| Total | 130 |

These materials were treated in the same manner as in Example 1 to obtain a test paint.

COMPARATIVE EXAMPLE 4

|   | G. |
|---|---|
| Polyvinyl chloride resin (V.A.G.H. of U.C.C.) | 20 |
| Dioctyl phthalate | 3 |
| Methyl isobutyl ketone | 60 |
| Toluene | 60 |
| Total | 145 |

These materials were treated in the same manner as in Example 1 to obtain a test paint.

The nine paints obtained in the examples and the comparative examples were subjected to measurement of friction coefficient and critical PV value by means of a friction measurer of Toyo Measuring Instruments Co. Ltd. (EFM—III), in which one of two cylinders is rotated while being rubbed with the other cylinder at the cross-section and detecting the friction force at that time by means of a load cell and in which the fixed cylinder is made of 45 C steel and the rotating cylinder is made of ordinary iron coated with the test paint obtained in the examples and comparative examples (thickness of dry film: 10 to 15 microns) and baked at 200° C. for 20 min. in the case of Examples 1 to 4 and Comparative Examples 1 to 3 or dried at room temperature for 7 days in the case of Example 5 and Comparative Example 4. The friction coefficients and the critical PV values obtained were as shown in Table 1.

TABLE 1

| Example number | Friction coefficient ($\mu$) | | Critical PV value |
|---|---|---|---|
|  | At break of film | Minimum value during measurement |  |
| 1 | 0.17 | 0.03 | 530 |
| 2 | 0.13 | 0.13 | 160 |
| 3 | 0.13 | 0.12 | 140 |
| 4 | 0.20 | 0.03 | 250 |
| 5 | 0.40 | 0.30 | 10 |
| Comparative 1 | 0.23 | 0.04 | 210 |
| Comparative 2 | 0.14 | 0.12 | 130 |
| Comparative 3 | 0.52 | 0.52 | 15 |
| Comparative 4 | 0.60 | 0.60 | 5 |

As is clear from the above results, the present coating composition containing fluorinated graphite powder has an increased critical PV value and simultaneously a small friction coefficient, and hence, is excellent as a coating composition for dry film lubricant.

What we claim is:

1. In a coating composition for dry film lubricant containing an epoxy resin, a phenolic resin or a polyvinyl resin having dispersed therein a lubricating material, the improvement wherein said lubricating material comprises a fluorinated graphite powder having a particle size of up to 60 microns and a conventional lubricating material selected from the group consisting of molybdenum disulfide, graphite and polytetrafluoroethylene having a particle size of up to 60 microns, the proportion of the conventional lubricating material to the fluorinated graphite powder being 99.5:0.5 to 5:95 by weight and the proportion of said synthetic resin to the mixture being 90:10 to 10:90 by weight.

2. A coating composition according to claim 1, wherein the proportion of the conventional lubricating material to the fluorinated graphite powder is 70:30 to 30:70 by weight.

3. A coating composition according to claim 1, wherein the proportion of the synthetic resin to the mixture is 60:40 to 40:60 by weight.

4. A coating composition according to claim 1, wherein the proportion of the conventional lubricating material to the fluorinated graphite powder is 10:40 to 40:10 by weight.

References Cited
UNITED STATES PATENTS

| | | | |
|---|---|---|---|
| 3,223,626 | 12/1965 | Murphy et al. | 252—25 |
| 3,287,288 | 11/1966 | Reiling | 252—12 |
| 3,288,710 | 11/1966 | Hollitz | 252—25 |
| 3,397,087 | 8/1968 | Yoshizawa | 117—121 |
| 3,406,854 | 10/1968 | Lesta | 252—12 |
| 3,429,844 | 2/1969 | Neros et al. | 252—12 |
| 3,437,593 | 4/1969 | Bellavin | 252—25 |
| 3,467,596 | 9/1969 | Hermann | 252—12 |
| 3,264,215 | 8/1966 | Smith et al. | 252—12 |
| 3,453,208 | 7/1969 | Gallagher et al. | 252—12 |
| 3,496,003 | 2/1970 | Simon-Vernnot | 252—25 |
| 3,607,747 | 9/1971 | Ishikawa | 252—25 |
| 3,607,747 | 9/1971 | Ishikawa et al. | 252—12 |
| 3,717,576 | 2/1973 | Hiratsuka et al. | 252—12 |

DANIEL E. WYMAN, Primary Examiner

I. VAUGHN, Assistant Examiner